US00RE41012E

(19) United States
(12) Reissued Patent
Barry et al.

(10) Patent Number: US RE41,012 E
(45) Date of Reissued Patent: Nov. 24, 2009

(54) REGISTER FILE INDEXING METHODS AND APPARATUS FOR PROVIDING INDIRECT CONTROL OF REGISTER ADDRESSING IN A VLIW PROCESSOR

(75) Inventors: Edwin Franklin Barry, Vilas, NC (US); Gerald George Pechanek, Cary, NC (US); Patrick R. Marchand, Apex, NC (US)

(73) Assignee: Altera Corporation, San Jose, CA (US)

(21) Appl. No.: 10/860,669

(22) Filed: Jun. 3, 2004

Related U.S. Patent Documents

Reissue of:
(64) Patent No.: 6,446,190
Issued: Sep. 3, 2002
Appl. No.: 09/267,570
Filed: Mar. 12, 1999

U.S. Applications:
(60) Provisional application No. 60/077,766, filed on Mar. 12, 1998.

(51) Int. Cl.
*G06F 9/34* (2006.01)
*G06F 9/35* (2006.01)
*G06F 9/44* (2006.01)
*G06F 9/355* (2006.01)
*G06F 9/30* (2006.01)

(52) U.S. Cl. ..... 712/229; 712/230; 712/24; 712/206; 712/215; 712/207; 712/211; 712/220; 711/214; 711/216

(58) Field of Classification Search ..... 712/229, 712/230, 24, 206, 215, 207, 211; 711/214, 711/216, 220

See application file for complete search history.

(56) References Cited

U.S. PATENT DOCUMENTS

| | | | | |
|---|---|---|---|---|
| 5,321,821 | A | | 6/1994 | Itomitsu et al. |
| 5,485,629 | A | | 1/1996 | Dulong |
| 5,495,598 | A | * | 2/1996 | Byers et al. ..... 714/712 |
| 5,517,628 | A | * | 5/1996 | Morrison et al. ..... 712/234 |
| 5,649,135 | A | | 7/1997 | Pechanek et al. |
| 5,671,382 | A | | 9/1997 | Shintani et al. |
| 5,680,600 | A | | 10/1997 | Childers et al. |
| 5,696,922 | A | | 12/1997 | Fromm |
| 5,721,854 | A | | 2/1998 | Ebcioglu et al. |
| 5,752,072 | A | | 5/1998 | Agarwal |
| 5,826,096 | A | | 10/1998 | Baxter |
| 5,890,222 | A | * | 3/1999 | Agarwal et al. ..... 711/220 |
| 6,023,252 | A | | 2/2000 | Yano et al. |
| 6,081,884 | A | | 6/2000 | Miller |

* cited by examiner

*Primary Examiner*—Daniel Pan
(74) *Attorney, Agent, or Firm*—Priest & Goldstein, PLLC

(57) ABSTRACT

A double indirect method of accessing a block of data in a register file is used to allow efficient implementations without the use of specialized vector processing hardware. In addition, the automatic modification of the register addressing is not tied to a single vector instruction nor to repeat or loop instructions. Rather, the technique, termed register file indexing (RFI) allows full programmer flexibility in control of the block data operational facility and provides the capability to mix non-RFI instructions with RFI instructions. The block-data operation facility is embedded in the iVLIW ManArray architecture allowing its generalized use across the instruction set architecture without specialized vector instructions or being limited in use only with repeat or loop instructions. The use of RFI in a processor containing multiple heterogeneous execution units which operate in parallel, such as VLIW or iVLIW processors, allows for efficient pipelining of algorithms across multiple execution units while minimizing the number of VLIW instructions required.

47 Claims, 12 Drawing Sheets

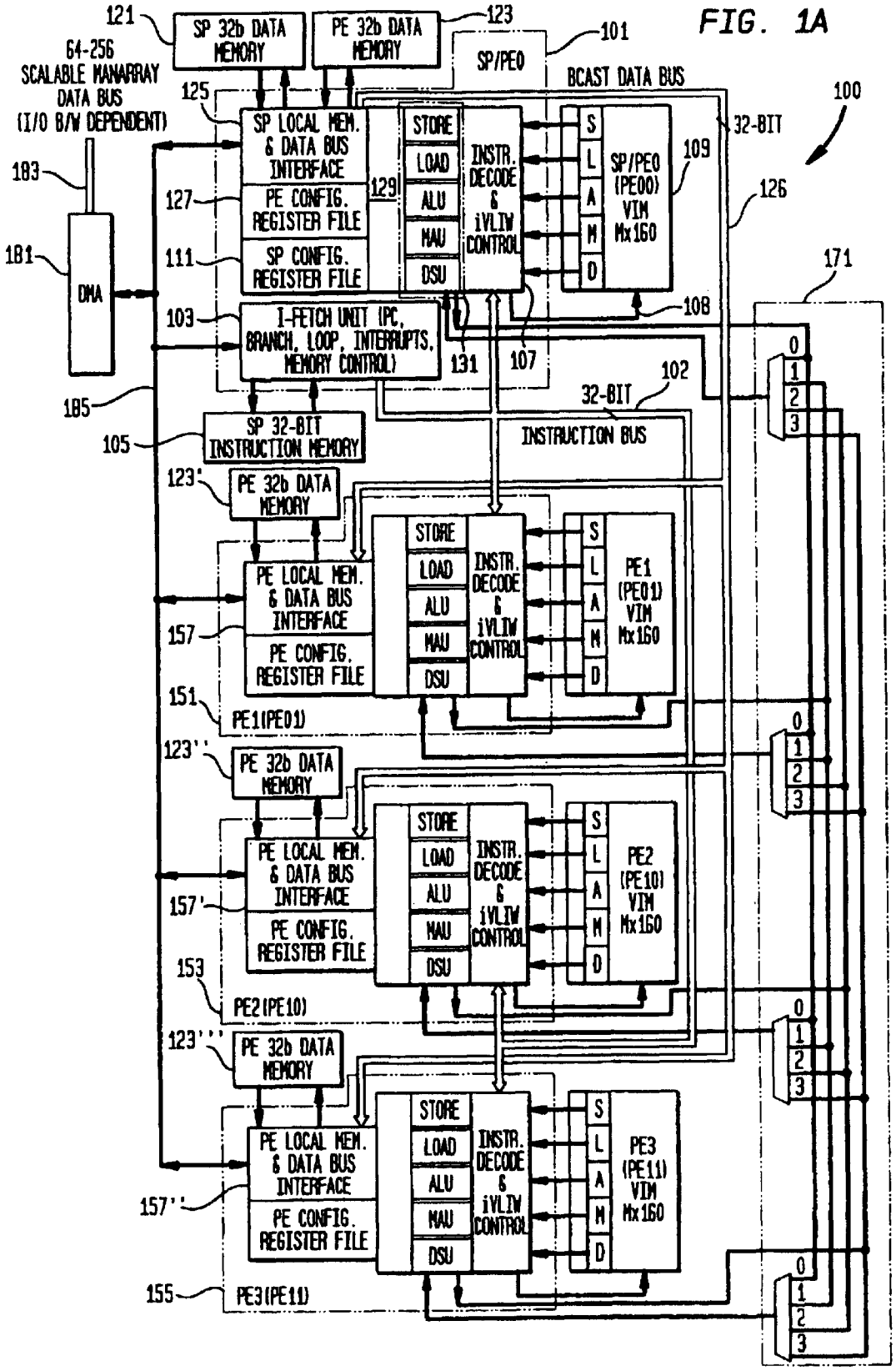
FIG. 1A
100
121
SP 32b DATA MEMORY
PE 32b DATA MEMORY
123
101
SP/PE0
64-256 SCALABLE MANARRAY DATA BUS (I/O B/W DEPENDENT)
BCAST DATA BUS
125
SP LOCAL MEM. & DATA BUS INTERFACE
PE CONFIG. REGISTER FILE
SP CONFIG. REGISTER FILE
127
111
129
STORE
LOAD
ALU
MAU
DSU
INSTR. DECODE & iVLIW CONTROL
S
L
A
M
D
SP/PE0 (PE00) VIM Mx160
109
32-BIT
126
183
181
DMA
171
103
I-FETCH UNIT (PC, BRANCH, LOOP, INTERRUPTS, MEMORY CONTROL)
131
107
108
102
32-BIT
185
105
SP 32-BIT INSTRUCTION MEMORY
INSTRUCTION BUS
123'
PE 32b DATA MEMORY
PE LOCAL MEM. & DATA BUS INTERFACE
PE CONFIG. REGISTER FILE
157
PE1 (PE01) VIM Mx160
151
PE1(PE01)
123''
PE 32b DATA MEMORY
PE LOCAL MEM. & DATA BUS INTERFACE
PE CONFIG. REGISTER FILE
157'
PE2 (PE10) VIM Mx160
153
PE2(PE10)
123'''
PE 32b DATA MEMORY
PE LOCAL MEM. & DATA BUS INTERFACE
PE CONFIG. REGISTER FILE
157''
PE3 (PE11) VIM Mx160
155
PE3(PE11)
0
1
2
3

FIG. 3A

300

The MRF for SP and PEs is as follows:

| | Address | SP (Mnemonic) | PE (Mnemonic) | Register Name |
|---|---|---|---|---|
| | 101000 | Reserved | Reserved | Reserved |
| | 101001 | Reserved | Reserved | Reserved |
| | 111010 | ⋮ | ⋮ | ⋮ |
| | 111011 | Reserved | Reserved | Reserved |
| 301 | 111100 | MRFXAR | MRFXAR | MRF Extension Address Register (Default is 0x00000000) |
| 302 | 111101 | MRFXDR1 | MRFXDR1 | MRF Extension Data Register-1(MRFX1 registers mapped here) |
| 303 | 111110 | MRFXDR2 | MRFXDR2 | MRF Extension Data Register-2(RFI registers mapped here) |
| 304 | 111111 | RFILSD | RFILSD | RFI Enable Address for Load, Store, and DSU block operations |

FIG. 3B

305

MRF Extension 1 (MRFX1) Registers are the following:

| MRFX1 address | SP (Mnemonic) | PE (Mnemonic) | Register Name |
|---|---|---|---|
| 000 | Reserved | Reserved | Reserved |
| 001 | Reserved | Reserved | Reserved |
| ⋮ | ⋮ | ⋮ | ⋮ |
| 111 | Reserved | Reserved | Reserved |

FIG. 3C

315

MRF Extension 2 (MRFX2) Registers are the following:

| | MRFX2 address | SP (Mnemonic) | PE (Mnemonic) | Register Name |
|---|---|---|---|---|
| 310 | 000 | RFIDLS0 | RFIDLS0 | 1st RFI DSU(H1), Load(B0), & Store(B1) Control Register |
| 320 | 001 | RFIAM0 | RFIAM0 | 1st RFI ALU(H1) & MAU(H0) Control Register |
| 330 | 010 | RFIDLS1 | RFIDLS1 | 2nd RFI DSU(H1), Load(B0), & Store(B1) Control Register |
| 340 | 011 | RFIAM1 | RFIAM1 | 2nd RFI ALU(H1) & MAU(H0) Control Register |
| 350 | 100 | RFIDLSI | RFIDLSI | DSU(H1), Load(B0), & Store(B1) Port Index Save/Restore Context |
| 360 | 101 | RFIAMI | RFIAMI | ALU(H1) & MAU(H0) Port Index Save/Restore Context |
| 370 | 110 | Reserved | Reserved | Reserved |
| 380 | 111 | RFIStart | RFIStart | 2nd Control Group Start bits (H1) & 1st Control Group Start bits(H0) |

FIG. 6

600

| 601 INCREMENT CONTROL | 602 RFBS CONTROL | 603 INCREMENT AMOUNT | 604 RFBS | 605 G 4 | 606 G 3 | 607 G 2 | 608 G 1 | 609 G 0 | 610 X 1 | 611 X 0 | 612 APPLICABLE UNITS |
|---|---|---|---|---|---|---|---|---|---|---|---|
| 0 | 000 | 0 | 1 | x | x | x | x | x | 0 | 0 | ALL |
| 0 | 001 | 1 | 2 | x | x | x | x | 0 | 0 | 1 | ALL |
| 0 | 010 | 1 | 4 | x | x | x | 0 | 1 | 0 | 1 | ALL |
| 0 | 011 | 1 | 8 | x | x | 0 | 1 | 1 | 0 | 1 | ALL |
| 0 | 100 | 1 | 16 | x | 0 | 1 | 1 | 1 | 0 | 1 | ALL |
| 0 | 101 | 1 | 32 | 0 | 1 | 1 | 1 | 1 | 0 | 1 | ALL |
| 0 | 110 | 1 | 64 | 1 | 1 | 1 | 1 | 1 | 0 | 1 | LOAD/STORE |
| 0 | 111 | RESERVED | RESERVED | - | - | - | - | - | - | - | RESERVED |
| 1 | 000 | RESERVED | RESERVED | - | - | - | - | - | - | - | RESERVED |
| 1 | 001 | RESERVED | RESERVED | - | - | - | - | - | - | - | RESERVED |
| 1 | 010 | 2 | 4 | x | x | x | 0 | 1 | 1 | 0 | ALL |
| 1 | 011 | 2 | 8 | x | x | 0 | 1 | 1 | 1 | 0 | ALL |
| 1 | 100 | 2 | 16 | x | 0 | 1 | 1 | 1 | 1 | 0 | ALL |
| 1 | 101 | 2 | 32 | 0 | 1 | 1 | 1 | 1 | 1 | 0 | ALL |
| 1 | 110 | 2 | 64 | 1 | 1 | 1 | 1 | 1 | 1 | 0 | LOAD/STORE |
| 1 | 111 | RESERVED | RESERVED | - | - | - | - | - | - | - | RESERVED |

620

FIG. 7A

LIM-LOAD IMMEDIATE

700

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | L/S | 000 | | | CE1 | LOC | | Rt5-0 | | | | | | IMM16 | | | | | | | | | | | | | | | |

LOC Location for LIM instruction
00=Load H1, do not affect H0
01=Load H0, do not affect H1
10=Load H0, H1=0x0000
11=Load H0, H1=0xFFFF

FIG. 7B

710

Syntax/Operation

| Instruction | Operands | Operation |
|---|---|---|
| | | WORD |
| LIM.[SP].W | Rt, IMM17 | if (MSB(IMM17)==1)Rt.H1 0xFFFF<br>if (MSB(IMM17)==0)Rt.H1 0x0000<br>Rt.H0 ←— IMM16 |
| T.LIM.[SP].W | Rt, IMM17 | Do operation only if T condition is satisfied in F0 |
| | | HALFWORD |
| LIM.[SP].H1 | Rt, IMM16 | Rt.H1 ←— IMM16 |
| LIM.[SP].H0 | Rt, IMM16 | Rt.H0 ←— IMM16 |
| T.LIM.[SP].[H0H1] | Rt, IMM16 | Do operation only if T condition is satisfied in F0 |

Arithmetic Flags Affected
None
Cycles: 1

800
INSTRUCTION BUS
803
INSTRUCTION REGISTER
804
OPCODE EXTENSION
Ry(5)
Rx(5)
Rt(5)
ALU, MAU, OR DSU OPCODE
805
806
807
809
MAF DATA BUS
STORE UNIT
LOAD UNIT
ALU
MAU
DSU
852
854
818
REGISTER FILE
PORT
817
PORT ADDRESS REGISTER
816
830
831
832
833
834
835
836
FA
UPDATE CONTROL REGISTER0
UPDATE CONTROL LOGIC
G3
G2
G1
X1
G0
X0
INDEXED PORT LOOK AHEAD REGISTER
START BIT & MUX CONTROL
RFI ENABLE
810
811
812
813
814
815
819
820
821
822
823
824
825
861
862
863
864
865
841
842
843
844
845
846
847
848

REGISTER FILE INDEXING METHODS AND APPARATUS FOR PROVIDING INDIRECT CONTROL OF REGISTER ADDRESSING IN A VLIW PROCESSOR

Matter enclosed in heavy brackets [ ] appears in the original patent but forms no part of this reissue specification; matter printed in italics indicates the additions made by reissue.

CROSS REFERENCE TO RELATED APPLICATIONS

The present application claims the benefit of U.S. Provisional Application Ser. No. 60/077,766 filed Mar. 12, 1998 and entitled "Register File Indexing Methods and Apparatus for Providing Indirect Control of Register in a VLIW Processor."

FIELD OF THE INVENTION

The present invention relates generally to improvements in very long instruction word (VLIW) processing, and more particularly to advantageous register file indexing (RFI) techniques for providing indirect control of register addressing in a VLIW processor.

BACKGROUND OF THE INVENTION

One important processor model is that of vector processing. This model has been used in prior art super computers for many years. Typical features of this model are the use of specialized vector instructions, specialized vector hardware, and the ability to efficiently operate on blocks of data. It is this very ability to operate typically only on vector data types that makes the model inflexible and unable to efficiently handle diverse processing requirements. In addition, in prior art vector processors, support for control scalar processing was typically done in separate hardware or in a separate control processor. Another processor model is the prior art very long instruction word (VLIW) processor model which represents a parallel processing model based on the concatenation of standard uniprocessor type single function operations into a long instruction word with no specialized multicycle vector processing facilities. To efficiently operate a block-data vector pipeline, it is important to have an efficient interface to deliver the individual vector elements. For this purpose, a successful class of prior art vector machines have been register based. The register based vector processors provide high performance registers for the vector elements allowing efficient access of the elements by the functional execution units. A single vector instruction tied to an implementation specific vector length value causes a block data multicycle operation. In addition, many vector machines have provided a chaining facility where operations on the individual vector elements are directly routed to other vector functional units to improve performance. These previous features and capabilities provide the background for the present invention. It is an object of the present invention to incorporate scalar, VLIW, and flexible vector processing capabilities efficiently in an indirect VLIW processor.

In typical reduced instruction set computer (RISC) and VLIW processors, the access of register operands is determined from short instruction word (SIW) bit-fields that represent the register address of operands stored in a register file. In register-based vector processors, specialized hardware is used. This hardware is initiated by a single vector instruction and automates the accessing of vector elements (operand data) from the dedicated vector registers. The multicycle execution on the block of data is also automated.

In the prior art, there have also been specialized hardware techniques used to support the automatic accessing or register operand data. For example, U.S. Pat. No. 5,680,600 which describes a technique for accessing a register file using a loop or repeat instruction to automate the register file addressing. This approach ties the register addressing to a loop or repeat instruction which causes a load or store instruction to be repeated while directing the register address to increment through a register file's address space. An electronic circuit is specified for reducing controller memory requirements for multiple sequential instructions. Thus, this prior art approach appears to be applied only to load and store type operations invoked by a special loop or repeat instruction. As such, it is not readily applicable to indirect VLIW ManArray processors as addressed further below.

SUMMARY OF THE INVENTION

A ManArray family of processors may suitably consist of multiple "indirect VLIW" (iVLIW) processors and processor elements (PEs) that utilize a fixed length short instruction word (SIW) of 32-bits. An SIW may be executed individually by one of up to eight execution units per processor and in synchronism in multiple PEs in a SIMD mode of operation. Another type of SIW is able to reference a VLIW indirectly to cause the issuance of up to eight SIW instructions in parallel in each processor and in synchronism in multiple PEs to be executed in parallel.

Operands are stored in register files and each execution unit has one or more read and write ports connected to the register file or files. In most processors, the registers selected for each port are addressed using bit fields in the instruction. With the indirect VLIW technique employed in the ManArray processor, the SIWs making up a VLIW are stored in a VLIW memory. Since each SIW fixes a register operand field by definition for a single operation on register accessed operand data, multiple VLIWs are required whenever a single operand field must be different as required by a processing algorithm. Thus, a suitable register file indexing technique for operation on blocks of data for use in conjunction with such processors and extendible more generally to parallel array processors will be highly advantageous.

This operand-data fixed register specification problem is solved by the present invention by providing a compact means of achieving pipelined computation on blocks of data using indirect VLIW instructions. A double indirect method of accessing the block of data in a register file is used to allow efficient implementations without the use of specialized vector processing hardware. In addition, the automatic modification of the register addressing is not tied to a single vector instruction, nor to repeat or loop instructions. Rather, the present technique, termed register file indexing (RFI) allows full programmer flexibility in control of the block data operational facility and provides the capability to mix non-RFI instructions with RFI instructions. The block-data operation facility is embedded in the iVLIW ManArray architecture allowing its generalized use across the instruction set architecture without specialized vector instructions, and without being limited to use only with repeat or loop instructions. Utilizing the present invention, chaining operations are inherently available without any direct routing between functional units further simplifying implementations. In addition, the present register file indexing architecture reduces the VLIW memory requirements which can be particularly significant depending on the types of algorithms to be coded.

Further, when expressed as unrolled loops of VLIW instructions, many computations exhibit clear register usage patterns. These patterns are characteristic of computational pipelines and can be taken advantage of with the ManArray indirect vector processing embedded in an indirect VLIW processor as adapted as described further herein.

Among its other aspects, the present invention provides a unique initialization method for generating an operand register address, a unique double-indirect execution mechanism, a unique controlling method, and allows a register file to be partitioned into independent circular buffers. It also allows the mixing of RFI and non-RFI instructions, and a scaleable design applicable to multiple array organizations of VLIW processing elements. As addressed in further detail below, the invention reduces both the VLIW memory and, as a consequence, SIW memory requirements for parallel instruction execution in an iVLIW array processor.

These and other features, aspects and advantages of the invention will be apparent to those skilled in the art from the following detailed description taken together with the accompanying drawings.

BRIEF DESCRIPTION OF THE DRAWINGS

FIG. 1A illustrates a 2×2 ManArray iVLIW processor suitable for use in conjunction with the present invention;

FIG. 3A illustrates a ManArray miscellaneous register file (MRF) identifying the location of the RFI control registers;

FIG. 3B illustrates the MRFX1 extension registers;

FIG. 3C illustrates the MRFX2 extension registers, and identifies the RFI registers used in the sequence processor (SP) and processing elements (PEs);

FIG. 6 illustrates exemplary specific control encodings used for each RFI port;

FIG. 7A illustrates a suitable load immediate (LIM) instruction encoding which may be used for loading the RFI control values of the present invention;

FIG. 7B illustrates an LIM syntax/operation description;

DETAILED DESCRIPTION

Figure 1B:
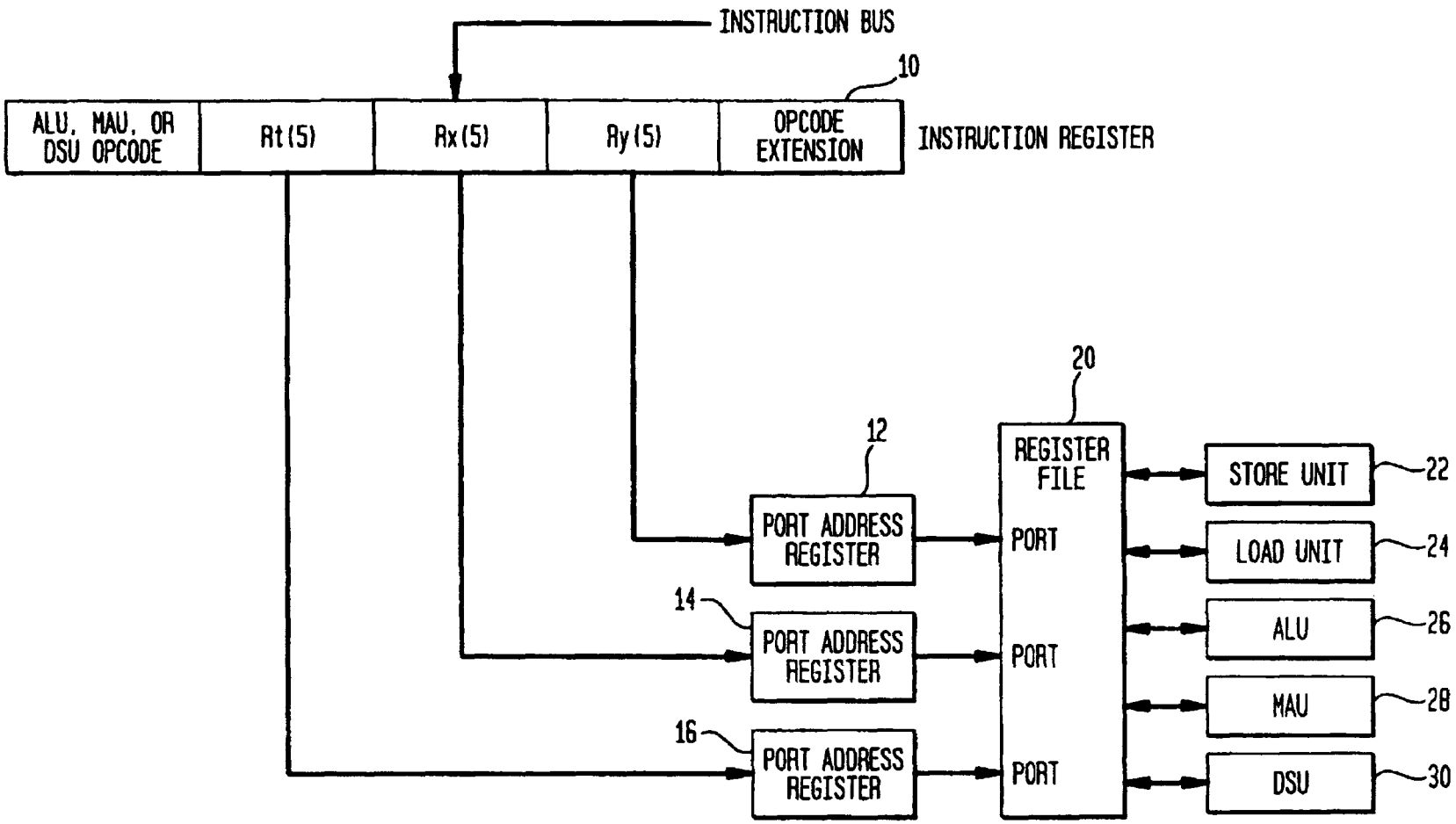
FIG. 1B (PRIOR ART)
FIG. 1B illustrates a typical prior art register addressing mechanism.

Further details of a presently preferred ManArray architecture for use in conjunction with the present invention are found in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999, and U.S. patent application Ser. No. 09/238,446 filed Jan. 28, 1999, as well as, Provisional Application Serial No. 60/092,130 entitled "Methods and Apparatus for Instruction Addressing in Indirect VLIW Processors" filed Jul. 9, 1998, Provisional Application Serial No. 60/103,712 entitled "Efficient Complex Multiplication and Fast Fourier Transform (FFT) Implementation on the ManArray" filed Oct. 9, 1998, Provisional Application Ser. No. 60/106,867 entitled "Methods and Apparatus for Improved Motion Estimation for Video Encoding" filed Nov. 3, 1998, Provisional Application Serial No. 60/113,637 entitled "Methods and Apparatus for Providing Direct Memory Access (DMA) Engine" filed Dec. 23, 1998, and Provisional Application Serial No. 60/113,555 entitled "Methods and Apparatus Providing Transfer Control" filed Dec. 23, 1998, respectively, and incorporated by reference herein in their entirety.

In a presently preferred embodiment of the present invention, a ManArray 2×2 iVLIW single instruction multiple data stream (SIMD) processor 100 shown in FIG. 1A contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate register file indexing and its scalable nature in accordance with the present invention. It is noted that the in parenthesis for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing loop operations, support for interrupts, and provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g., fixed point execution units, and the PE0, as well as the other PEs 151, 153 and 155, can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs, identified by the letters SLAMD in 109, stored in the VIM. The ManArray pipeline design provides an indirect VLIW memory access mechanism without increasing branch latency by providing a dynamically reconfigurable instruction pipeline for the indirect execute iVLIW (XV) instructions as described in further detail in U.S. patent application Ser. No. 09/228,374 entitled "Methods and Apparatus to Dynamically Reconfigure the Instruction Pipeline of an Indirect Very long Instruction Word Scalable Processor". The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123" and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. patent application Ser. No. 08/885,310 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in the DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via bus 185.

All of the above noted patents are assigned to the assignee of the present invention and incorporated herein by reference in their entirety.

Turning now to specific details of the ManArray processor apparatus as adapted to the present invention, this approach advantageously provides an efficient and flexible block-data operation capability through a double indirect mechanism.

Register File Indexing Programming View

Register file indexing (RFI) in accordance with one aspect of the present invention refers to methods and apparatus in each processing element and in the array controller for addressing the operand register file through a double indirect mechanism rather than directly through fields of an SIW, or through specialized vector instructions and vector hardware or with a required repeat or loop instruction. Each execution unit operates read and write ports of one or more register files. A read or write port consists of register selection address and control lines supplied to the register file, a data bus for register data being read from the register file for a read port, and a data bus for register data being written to the register file for a write port. The inputs to the register selection logic of these ports typically came only from bit-fields of the instruction being executed as shown in the prior art apparatus of FIG. 1B. In FIG. 1B, the instruction received in a processor's instruction register 10 typically contained register file addresses which are typically latched in port address registers, such as the registers 12, 14 and 16, and then directly used to address the register file, such as register file 20, to support the instruction execution by units, such as store unit 22, load unit 24, ALU 26, MAU 28 and DSU 30 of FIG. 1B.

In addition to this typical method for register selection, RFI operation in accordance with the present invention allows each register file port of each execution unit to also be independently controlled through a double indirect mechanism using simple control circuitry as addressed further below.

RFI Operation

Figure 2A:
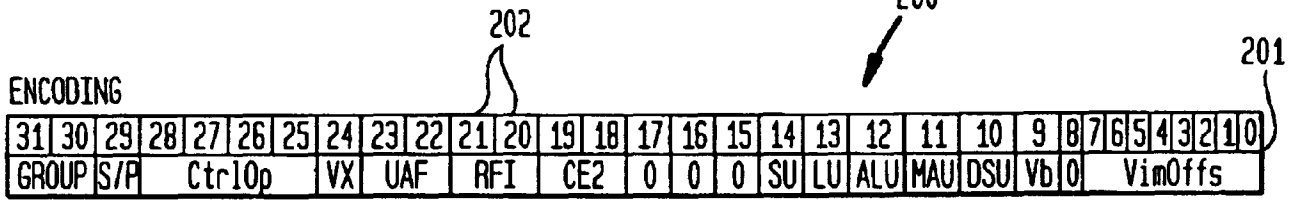
FIG. 2A illustrates an XV instruction encoding with RFI enabling bits in accordance with the present invention.
Figure 2B:
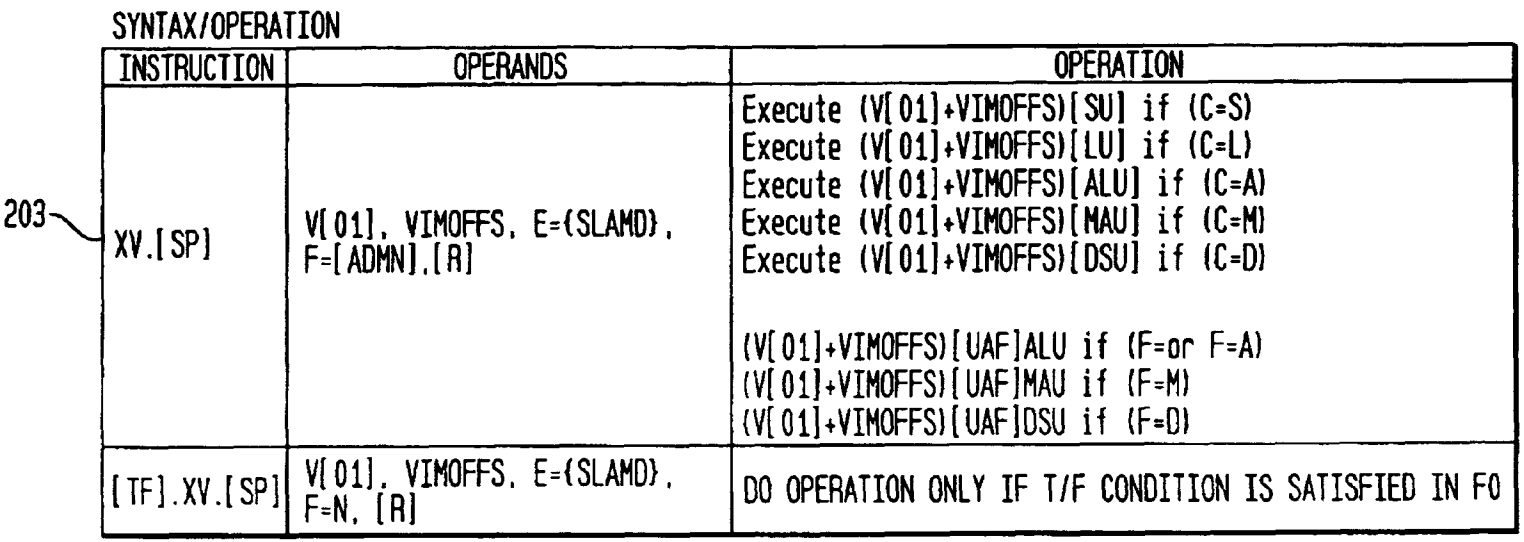
FIG. 2B illustrates an XV syntax/operation description suitable for use in the present invention.
Figure 4A:
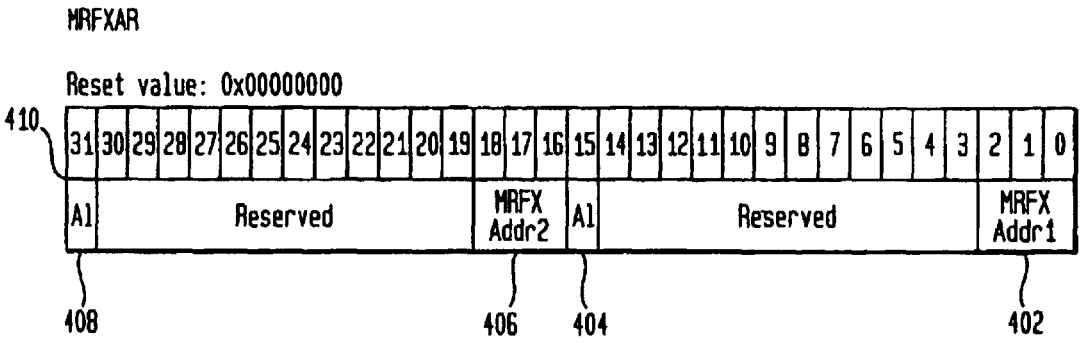
FIG. 4A illustrates an MRFXAR register which controls the selection of the extension register.
Figure 4B:
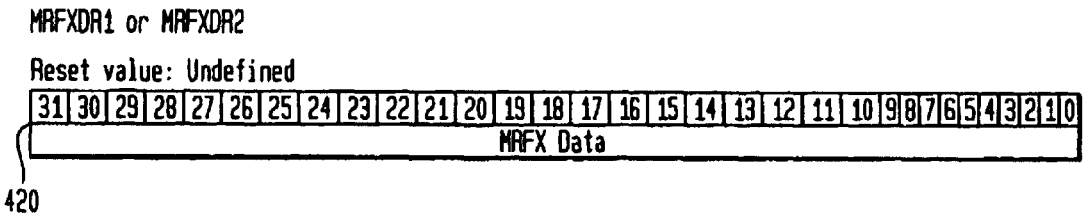
FIG. 4B illustrates the data format for MRFXDR1 and MRFXDR2 wherein the RFI control registers are mapped as specified by the MRFXAR register values of FIG. 4A.

RFI operation may advantageously be embedded in the ManArray iVLIW architecture and invoked by a double indirect mechanism. An exemplary execute VLIW (XV) instruction 200 having 32 bit encoding format 201 is shown in FIG. 2A. A syntax/operation table 203 summarizing instruction syntax, the parameters or operands, and the operations carried out by the instruction 200 is shown in FIG. 2B. ManArray RFI operation uses bits 20 and 21, RFI operation bits 202, in the execute VLIW (XV) instruction 200 as shown in FIG. 2A to enable RFI operation.

In further detail, the XV instruction 200 is used to indirectly cause individual instruction slots of a specified SP or PE VLIW Memory (VIM) to be executed. The VIM address is computed as the sum of a base VIM address register Vb (V0 or V1) plus an unsigned 8-bit offset VIMOFFS. Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), and D=Data Select Unit (DSU). A blank 'E='parameter does not execute any slots. The unit affecting flags (UAF) parameter 'F=[AMDN] overrides the UAF specified for the VLIW when it was loaded via a load VLIW (LV) instruction. The override selects which arithmetic instruction slot (A=ALU, M=MAU, D=DSU) or none (N=NONE) is allowed to set condition flags for this execution of the VLIW. The override does not affect the UAF setting specified via the LV instruction. A blank 'F=' selects the UAF specified when the VLIW was loaded. The register file indexing (RFI) parameter 'R=[01N] is used to enable or disable RFI for this XV's indirect execution of the instruction slots. With 'R=0' (the RFI operation bits 202=00 in FIG. 2A), RFI operation is enabled and the RFI control register group 0 is selected. With 'R=1' (the bits 202=01), RFI operation is enabled and the RFI Control Register group 1 is selected. With 'R=N' (the bits 202=11), RFI operation is disabled.

The XV instruction with RFI enabled causes a second indirect operation to be initiated. The second indirect operation comes into play on the next XV instruction that is executed, wherein the register port addresses are indirectly specified through automatically incrementing hardware controlled in a manner specified by separate RFI control parameters. The RFI operation is described below, in the context of the ManArray pipeline, primarily concerned with the decode and execute phases of the pipeline, RFI control consists of four parts: 1) RFI control specification; 2) RFI initialization control; 3) RFI update control; and 4) RFI instruction execution.

RFI Control Specification

RFI control specification is preferably performed through RFI control registers. Each control register specifies all the RFI control information for the register ports used by a particular execution unit. There is a control field in the control register for each port and this field specifies whether or not the RFI operation is enabled for that particular port and, if enabled, specifies the RFI register update policy.

The RFI control registers are accessed through a ManArray miscellaneous register file (MRF) 300 illustrated in FIG. 3A. This register file is unique in that additional registers can be added within the restricted MRF address space by address mapping additional registers to a single MRF address. The MRF extension registers 305 and 315, shown in FIGS. 3B and 3C respectively, are accessed using the MRF extension address register (MRFXAR) 301 and the MRF extension data registers (MRFXDR) 302 and 303. The two MRF extension data registers 302 and 303 are provided to simplify the implementation, and to separate the intended uses of each set of extension registers. A register address is written to the half-word H1 or H0 portion of the 32-bit MRFXAR register 410 of FIG. 4 using a load immediate instruction as illustrated in FIGS. 7A and B. The relationships of the respective parts of FIGS. 3A–3C, and 4A and 4B are more fully set forth as follows:

| | |
|---|---|
| MRFX Addr1 402 (FIG. 4A) | MRF Extension Register Address-1. This field contains the address of a register within the MRF extension register group-1 of FIG.3B. When the MRFXDR1 302 of FIG. 3A is read or written, the MRFX1 register in FIG. 3B specified by this address is the target of the read or write operation. |
| MRFX Addr2 406 (FIG. 4A) | MRF Extension Register Address-2. This field contains the address of a register within the MRF Extension register group-2 of FIG.3C. When the MRFXD2 303 of FIG. 3A is read or written, the MRFX2 register in FIG. 3C specified by this address is the target of the read or write operation. |
| AutoIncrement (AJ1 or AJ2) 404 or 408 (FIG. 4A) | When set, this bit causes the MRFX Address field 1 402 or field 2 406 of FIG. 4A to increment by 1 after each read or write access to the MRFXDR1 302 or MRFXDR2 303 of FIG.3A. |
| MRFX Data (MRFX1 or MRFX2) 420 (FIG. 4B) | A Load/Store or DSU operation (COPY, BIT op) which targets the MRFXDR1 302 or MRFXDR2 303 of FIG. 3A will access the MRFX register whose address is contained in bits [2:0] of the MRFXAR1 402 or bits[8:6] MRFXAR2 406 of FIG. 4A. If the auto increment bit 404 or 408 of the selected MRFXAR is set, then the access will also cause the address in the MRFXAR1 or MRFXAR2 to be incremented after the access. |

In a presently preferred embodiment, five execution units have RFI control. FIG. 3C shows a summary of an exemplary set of RFI control registers. These MRFX2 registers 510, 520, 530, 540, 550, 560, 570, and 580 are shown in further detail in FIG. 5, with each control register assigned to the read/write ports for the specified execution units. These execution units include arithmetic logic unit (ALU), multiply accumulate unit (MAU), data select unit (DSU), load unit, and the store unit.

The registers are used in two control groups (510–540), two save and restore context registers (550 and 560), and one register 580 to control the initialization of the RFI controls for each control group. A reserved register 570 is also shown. The first control group 0 includes RFIDLS0 310 and RFIAM0 320 in FIG. 3C. Further details are shown in registers 510 and 520 of FIG. 5. The second control group 1 includes RFIDLS1 330 and RFIAM1 340 with further details in registers 530 and 540.

When an iVLIW is executed, one of the control groups is specified in the XV instruction via bits 21 and 20, the RFI bits 202 of instruction 200 of FIG. 2 to allow RFI control of any port used by instructions in that VLIW. It will be recognized that the invention does not preclude using another mechanism for specifying the control information, or a subset of the control information, such as directly in an instruction.

Figure 5:
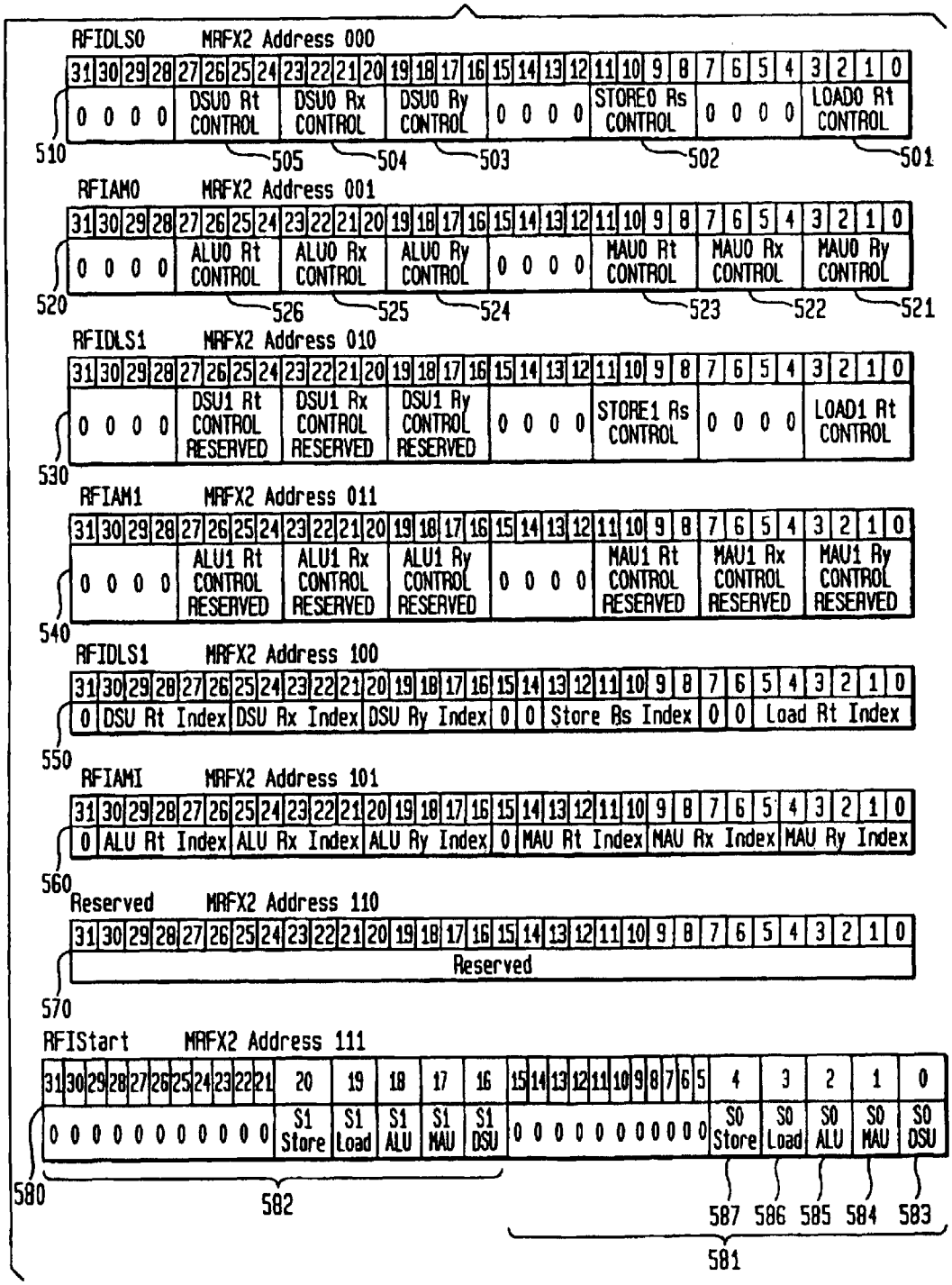
FIG. 5 illustrates preferred RFI control registers for use in conjunction with the present invention.

Specifically, in control group 0, RFIDLS0 510 in FIG. 5 contains the port control information for the single Load Rt port 501, the single Store Rs port 502, the three operand ports for the DSU Ry 503, Rx 504, and Rt 505. The second register in control group 0 RFIAM0 520 contains the port control information for the three operand ports for the MAU Ry 521, Rx 522, Rt 523 and the three operands ports for the ALU Ry 524, Rx 525, and Rt 526. Associated with the two control groups are initialization start bits which are contained for both control groups 0 and 1 in the RFIStart register 380 of FIG. 3C and in more detail in register 580 of FIG. 5. For control group 0, the initialization start bits are located in the H0 halfword 581 with a single bit per execution unit as follows: Store ports Start 0 bit-4 587, Load ports Start 0 bit-3 586, ALU ports Start 0 bit-2 585, MAU ports Start 0 bit-1 584, and DSU ports Start bit-0 583. In a similar manner, the control registers RFIDLS1 530, RFIAM1 540 for the second control group 1 are set up as shown in FIG. 5. The initialization start bits for control group 1 are located in H1 halfword 582 of RFIStart 580. The other two RFI registers RFIDLS1 550 and RFIAM1 560 store the port address values to save the values of the port addresses upon an interrupt in support of a context save and restore operation.

Note that the control parameters may have any format that allows a required set of control information to be represented, as the invention does not require a particular format. An exemplary format 600 for a register file port is shown in greater detail in FIG. 6. The RFI parameters are encoded into 4-bits as shown in columns 601 and 602. This control information specifies the type of update to be applied to generate the address of the next register to be selected on the next RFI instruction execution. In the presently preferred embodiment, the control parameters are used to select an update increment value 603 to be added to the register address, and to specify the maximum sequential (incrementing by one) register file address range (RFBS) that can be selected 604. As described further below, the starting register along with these parameters determines the actual register set which may be selected by the index. Columns 605–611 are used to describe the operation of the indirect vector apparatus shown in FIGS. 8 and 9. In these columns 605–611, an "x" represents a "don't care" state. Column 612, the applicable units column, specifies to which execution units the control parameters apply.

RFI Initialization Control

Figure 8:
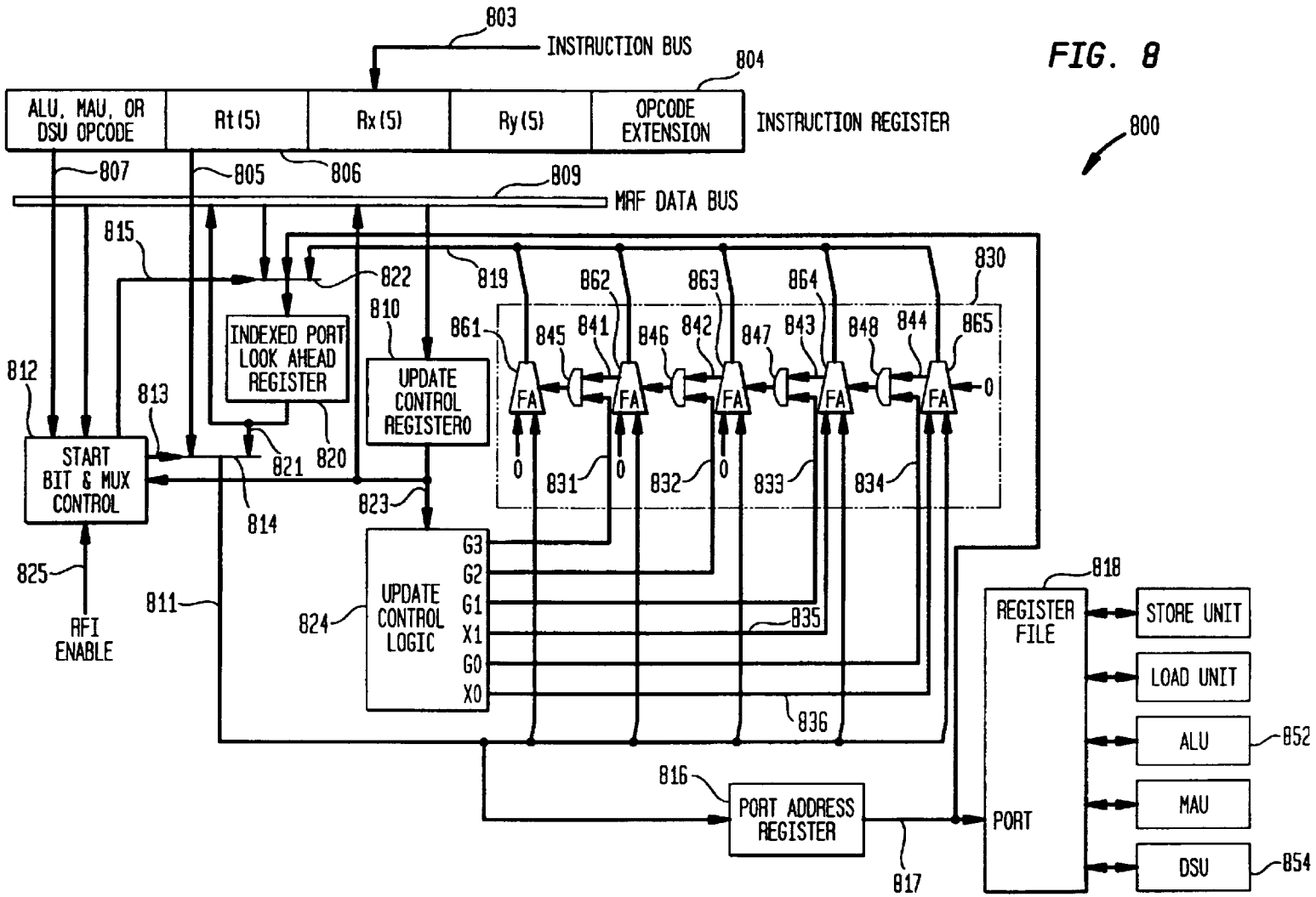
FIG. 8 illustrates an exemplary RFI control block diagram for the arithmetic execution units in accordance with the present invention.
Figure 9:
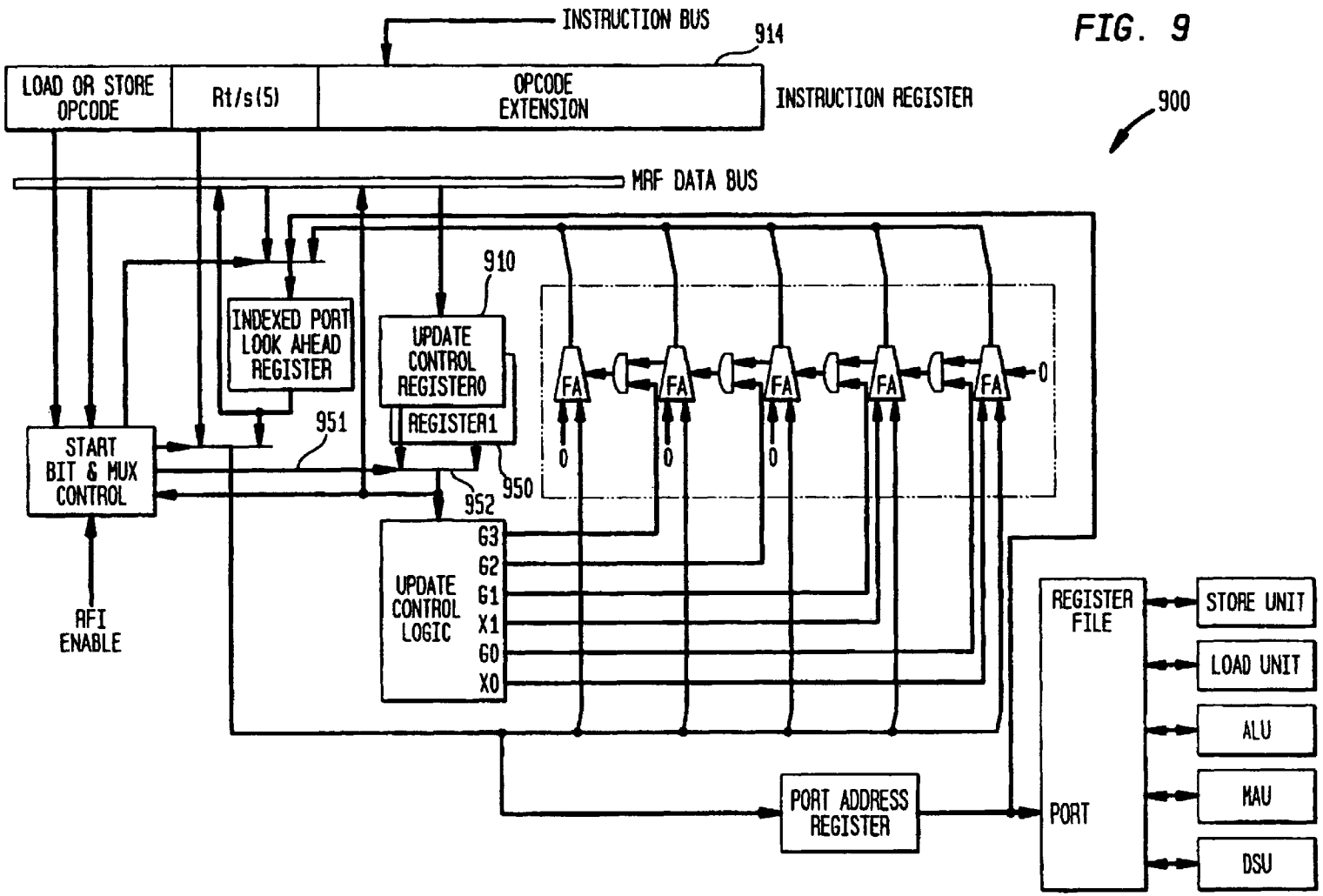
FIG. 9 illustrates an exemplary RFI control block diagram for the load and store execution units in accordance with the present invention.

RFI initialization takes place in two steps, which are best understood with reference to FIGS. 8 and 9. FIG. 8 shows an exemplary RFI apparatus 800 for the port logic in the arithmetic units. FIG. 9 shows an exemplary RFI apparatus 900 for the port logic in the load and store units. This exemplary description represents a low cost configuration which uses control group 0 for the ALU, MAU, and DSU units and both control groups 0 and 1 for the Load and Store units. This is a subset of the architecture description outlined in FIG. 5 and represents a programmer restriction, where all options are available for all execution units in control group 0 while control group 1 is used primarily for block move, save, and restore operations. When an RFI XV instruction selects the second control group 1 in implementations which allow for only control group 0 on the arithmetic units, the arithmetic units default to the control group 0 specification even when control group 1 is specified. This subset minimizes on implementation expense and is described in more detail as follows.

First, control information as illustrated in FIG. 6 for each register file port is written into an RFI control register 810 and 910 by use of a load immediate (LIM) instruction 700 whose encoding format is shown in FIG. 7A and whose syntax/operation 710 is shown in FIG. 7B. The LIM instruction 700 is first used to load MRFXAR halfword H1 410 of FIG. 4 to set up the desired extension RFI control register to be mapped to MRFXDR2 303 in FIG. 3A. Then, the LIM instruction loads a data value to the desired control register by using the address for MRFXDR2. Each halfword section of a control register is loaded separately be definition of the LIM instruction.

For purposes of clarity, the LIM data path from instruction register 804 H0 halfword bits 15-0 is not shown. This data path is selectively controlled to load the H0 halfword of the LIM instruction to either the low or high halfword portion of any of the MRF extension registers listed in FIG. 5. For example, a LIM instruction could cause the loading of its H0 halfword to the H1 portion of the RFIAM0 register 520 of FIG. 5. In reference to the common arithmetic RFI port control logic of FIG. 8, one of the three control portions of RFIAM0 would be located in an update control register 0 for that port, such as 810, for, in this case, the ALU 852. In a similar manner, the other two port control values would be loaded into their own port update control register 0s contained in their own RFI port control logic. Other ManArray instructions can load the RFI control registers through use of the MRF data bus 809. The MRF data bus 809 is also used for saving the RFI port registers, for example, during a context switch operation. The specific LIM instruction description is as follows. The halfword form of the LIM instruction loads a 16-bit immediate value into the upper halfword (H1) or lower halfword (H0) of an SP or PE target register Rt. The 16-bit immediate value is interpreted as a sign "neutral" value, meaning that any value in the range −32768 to 65535 is accepted. This covers the 2's complement signed value range of −32768 to +32767 and the unsigned value range of 0 to 65535.

The word form of the LIM instruction loads a signed-extended 17-bit immediate value into the target register. The 17-bit signed value may be any value in the range −65536 to 65535. The encoding for the word form of LIM puts the magnitude of the value into the IMM16 field and the sign bit is the LOC field bits 23 and 22 shown in FIG. 7A. LOC field determines if the upper halfword is filled with all one or all zero bits.

In the second step of RFI initialization, a start bit, e.g. bit 583 for the DSU 854, is set in the RFI Start Register, RFIStart of FIG. 5, that is located in the start bit and mux control block 812 for each of the arithmetic execution unit's ports and block 912 for a load or store unit's port. Each start bit controls the initialization for all the ports belonging to an execution unit. While this is the presently preferred format, the invention is not restricted to this format. The operation of setting this bit is performed by any instruction capable of writing to this register. At least one instruction of this type is available. The next instruction which invokes RFI control for this particular group and execution unit after the setting of this bit, hereafter referred to as the "RFI instruction", has its execution unit's operand registers first selected by fields in the instruction word and then, with the next RFI instruction for this group and execution unit, has its execution unit's operand registers selected under control of the RFI logic shown in FIGS. 8 and 9. With the RFI XV instruction, as described in FIGS. 2A and 2B, a VLIW set of SIWs is indirectly retrieved from a local VIM (five SIWs as described herein for a ManArray implementation as in FIG. 1A). For example, one of the set of five SIWs is loaded into an instruction register 804 as shown in FIG. 8. The port RFI logic for the fetched SIW Rt's port is also shown in FIG. 8. For the first execution of the fetched instruction, the Rt port address 805 is the starting address for an RFI block operation. The Rt port address 805 is passed through a multiplexer 814, as controlled by the start bit and mux control block 812 via control signal 813, to the port address register 816 via multiplexer output 811. The Rt port address, now contained on output 811, is latched into the port address register 816 at the end of the decode pipeline stage. The output of the port address register 816 directly addresses the register file 818 over signal path 817. The operands are selected from the register file 818 and the SIW operation is executed in the specified execution unit.

Upon the next issuance of an RFI XV instruction, the operands are indirectly specified from the RFI logic. This is the second indirect specification in the operational sequence. The first indirect specification is through the RFI XV instruction which indirectly specified the SIW and the second indirect specification is through the RFI logic as set up via the RFI control parameters. In order to accomplish this, operation update control register 0 810, update adder logic 830, indexed port look ahead register 820, multiplexers 814 and 822, and update control logic 824 are used to generate the updated port address to be used in following RFI instruction executions.

The basic concept is that the address output 811 of the multiplexer 814 is available early enough in the decode cycle so that the update adder logic 830 can update the address based upon the update control logic 824 signals. The updated address 819 is selected by mux control signals 815 to pass through multiplexer 822 and loaded into the index port look ahead register 820 at the end of decode at the same time the present port address 811 is loaded into the port address register 816. On the next RFI instruction, the look ahead register value 821 is used in place of the fetched SIW operand port address value and latched into the port address register 816 for the next execute cycle, while the update adder logic is again preparing the next port address to be used. After the first RFI instruction following the setting of the RFI start bit(s), the start bit(s) are cleared causing subsequent RFI instructions to have their SIW operand registers selected by corresponding indexed port look ahead registers. The start bit and mux control block 812 provide the control for determining whether an instruction's registers are selected by instruction fields or by RFI indexed port look ahead registers. Its inputs come from the instruction opcode 807, the update control register 0 810, and an RFI enable signal 825. These signals along with pipeline control signals (not shown) indicating an instruction's progress in the pipeline, determine the register selection source via the multiplexer 814.

The use of the indexed port look ahead register 820 allows non-RFI instructions to be intermixed between RFI operations without affecting the RFI register address sequence. When a non-RFI instruction is detected, the RFI logic preserves the required RFI state while the non-RFI instructions are executing.

RFI Update Control

When an RFI operation is invoked, the address of one or more registers in the register file 818 is supplied by the RFI logic. This logic updates the register address for the next cycle by adding or subtracting a constant from an address available in the early stages of the decode cycle while maintaining the generated port address within a particular set of register addresses. In the presently preferred embodiment, this is done by specifying an increment value and a register file block size (RFBS) 604 as shown in FIG. 6 for each port to be controlled. In the preferred embodiment, the RFBS value is an integer power of 2, such as 1,2,4,8, etc., and logically causes the register file to be partitioned into blocks of registers with RFBS sequentially addressed registers per block. Assume a starting register Rs ($R_{current}$=Rs on the first update), an RFBS value M, a floor quotient Q=⌊Rs/M⌋, and a positive update increment k, then the next register number, $R_{next}$, in a sequence is given by:

$$R_{next}=((R_{current}+k)\bmod M)+Q*M.$$

Because the remainder of Rs/M is ignored due to the floor operation, the value of Q*M≠Rs.

Figure 10:
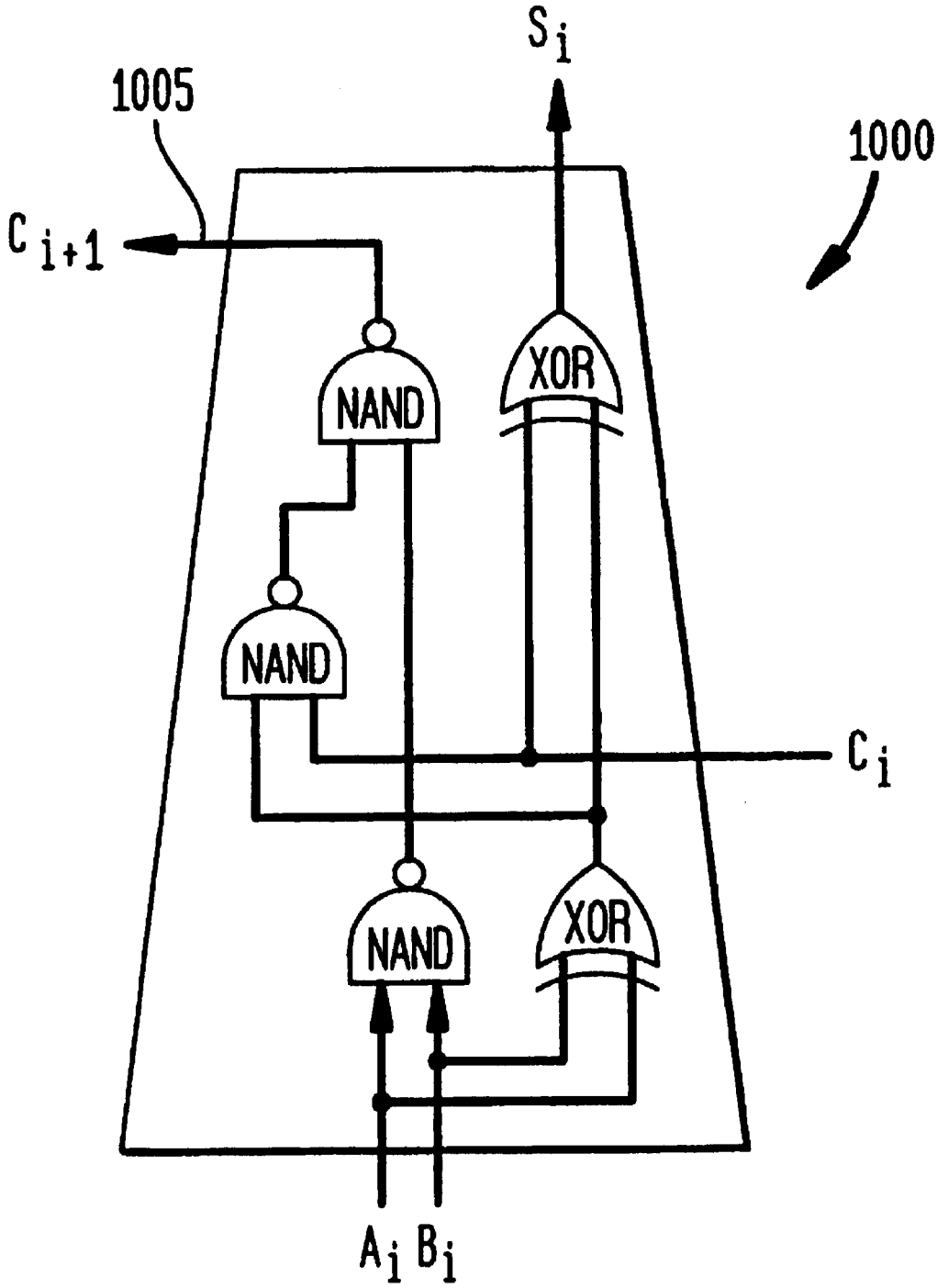
FIG. 10 illustrates a conventional full adder for use in the update adder logic units in each RFI port logic in one embodiment in accordance with the present invention.

As an example, assume that the starting register port address is 5, i.e. Rs=R5 which also equals $R_{current}$ for the first operation. Also, assume the update increment is k=2, and the RFBS is M=8. In FIG. 6, this exemplary setting corresponds to the row 620 which lists for FIG. 8 the corresponding signal values as follows: G3=x 606 and 831, G2=0 607 and 832, G1=1 608 and 833, G0=1 609 and 834, X1=1 610 and 835, and X0=0 611 and 836. The signals X1 and X0 provide the increment by 2 input to update adder logic 830. The gate signals G3, G2, G1, and G0 maintain the block size given an arbitrary starting register. The update adder logic 830 is made up of five standard full adders 861, 862, 863, 864 and 865, shown in further detail in FIG. 10. The carry out signal $C_{i+1}$ 1005 of full adder 1000 of FIG. 10 corresponds to the carry out signals 841–844 from each stage of the update adder 830. These carry out signals are gated by AND gates 845–848 and gate signals 831–834 effectively creating the modulo-adder required by the specified control description of FIG. 6. Under these assumptions, the successive instructions which specify this port using RFI will access registers in the following order: R5, R7, R1, R3, R5, R7, and so on. If the starting register is R8, then the sequence is; R8, R10, R12, R14, R8, R10, and so on. The present invention does not preclude using non-power of 2 increments and/or RFBSs, nor does it preclude using another mechanism of specifying a register address sequence within which to operate. For example, a read only memory can be used to replace the update control logic 824 and update adder logic 830 to provide any desired register port address sequences desired. Since using memory blocks may cause implementation wiring problems, being able to implement the update function in discrete logic is the presently preferred method.

FIG. 9 depicts the RFI logic 900 for the load and store units which have been identified to use two control register groups 910 and 950, respectively. The XV instruction specifies which group is to be used via the bits 21–20 202 of FIG. 2. In the exemplary system, when control register group 1 is indirectly specified, the load and store SIWs fetched from the VIM use update control register 1 950 as selected via mux control signal 951 through multiplexer 952 while the arithmetic units default to using control register group 0. In alternative implementations, the RFI port logic of FIG. 9 can be used for each arithmetic execution unit providing two RFI contexts for all of the execution units.

In a VLIW processor, it is possible to have all ports of the register file under RFI control for a single instruction, such as the presently described XV instruction. Since the RFI port logic is independent between execution units, the ports can be individually controlled by SIW execution-unit-specific instructions. This means that if another instruction or group of instructions requires independent RFI control (i.e. a different set of control parameters) in addition to the XV instruction, another group of control registers could be assigned. Since the RFI set up latency is relatively small, the control register set as described in FIG. 5 can be easily shared with other RFI instructions.

Figure 11:
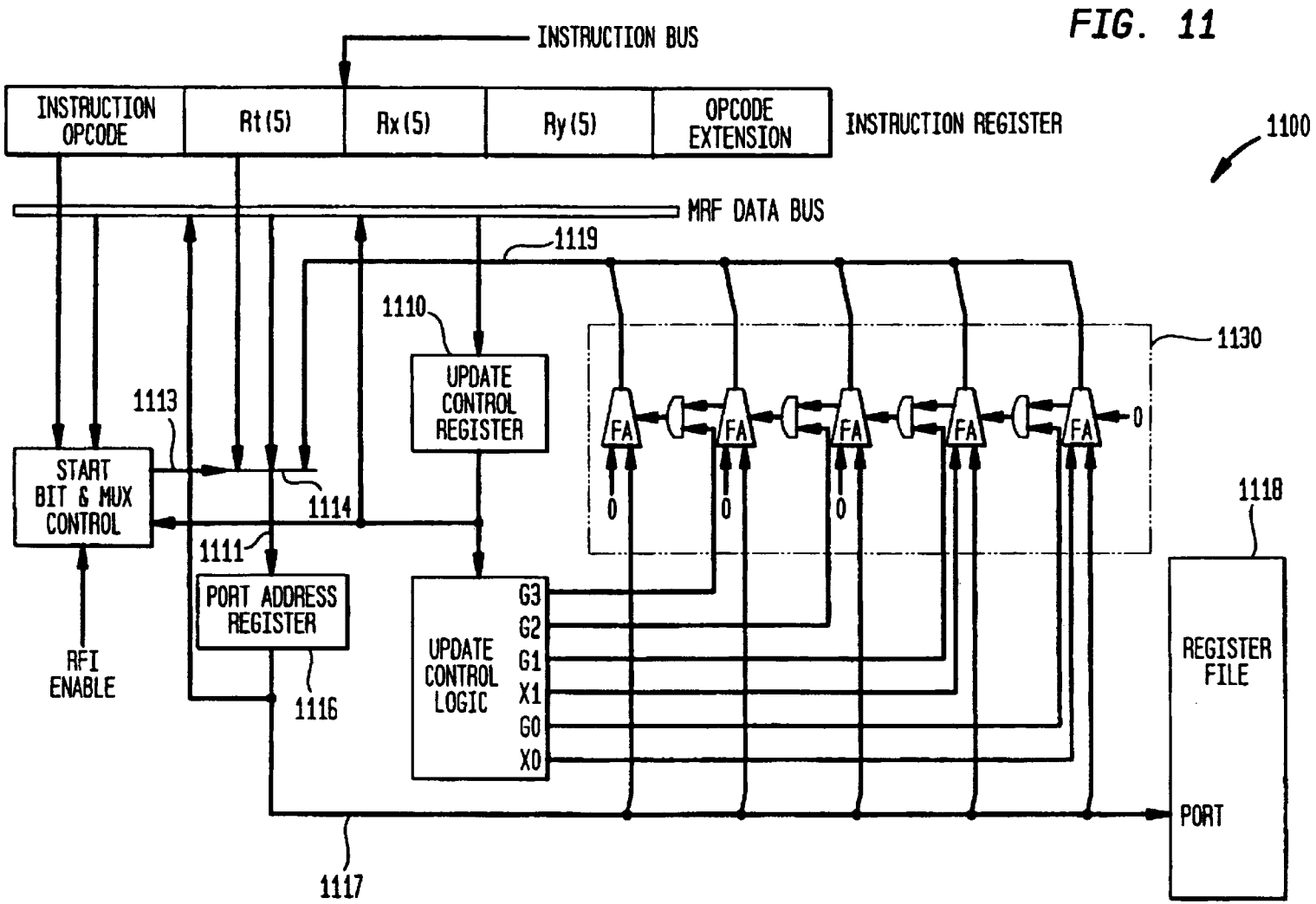
FIG. 11 illustrates a reduced cost RFI control block diagram for the arithmetic execution units in one embodiment in accordance with the present invention.

Another register file indexing apparatus 1100 is shown in FIG. 11. This RFI mechanism still uses the double indirect mechanism outlined in the other RFI approaches discussed relative to FIGS. 8 and 9. In the approach of FIG. 11, however, a programming restriction is enforced requiring that for the block of data being processed, RFI operations cannot be mixed with non-RFI operations. This approach is different than the approach used in FIGS. 8 and 9 which allows RFI and non-RFI instructions to be mixed. For some product definitions, this is not a problem and the simplified hardware approach of FIG. 11 can be used.

The operation of the apparatus 1100 of FIG. 11 is similar to the operation of the previous RFI approach. For example, the start bit for RFI initialization is used as previously described. The main difference in FIG. 11 is that no indexed port look ahead register, like register 820 of FIG. 8 is used. Rather, a port address register 1116 still addresses a register file 1118, but update adder logic 1130 operation is displaced in time, as compared to the approach used in FIG. 8, operating on the latched port address register output 1117 during the execute cycle. In preparation for the next execute cycle, the update adder logic 1130 updates the output 1117 of the port address register 1116 as specified by an RFI update control register 1110 for this port. By the end of the present execute cycle, multiplexer 1114 is controlled via control input 1113 to select an update adder logic output 1119 to pass through multiplexer 1114 to output 1111. The multiplexer 1114 output 1111 is then latched in the port address register 1116 at the start of the next execute cycle thereby updating the register file port address as specified by the RFI control set up previously.

In addition to the XV RFI enabling apparatus, other means of enabling RFI are used. The purpose of this additional mechanism is to decouple the RFI sequencing from only being used in the VLIW (XV) programming model. It is desired to support block load, block store, and block move operations with single instruction execution, which can be independently done in the SP or concurrently in the PEs. Rather than use additional bits in SIWs to specify this operation, though this is not precluded by this invention, an alternate indirect mechanism to enable RFI is used. This savings in bits in the SIWs allows better use of the instruction format for standard operation encoding while not precluding the ability to achieve the RFI functionality provided by the present invention. This alternative mechanism operates with any SIW that can address a specific location in the MRF. Though multiple locations in the MRF could be provided for this purpose, there are other uses in specific implementations which may preclude this. For the purposes of describing this alternate RFI enabling mechanism, one location in the MRF is used, as shown for RFILSD 304 in FIG. 3A.

To use the RFI enabling mechanism, the hardware decode logic is extended to generate the RFI enable signal not only when an XV RFI instruction is received but also whenever a load, store, or DSU instruction is received in the SP or PE instruction register which specifies the RFILSD address as the load Rt, store Rs, or DSU Rt or Rs operands. Prior to using this alternate·RFI enabling mechanism, the RFI control registers are required to be set up specifying the initial registers to be used in a block load, store, or DSU operation. No start bit is used in this alternate RFI enabling mechanism as the starting address of the block sequence is stored in the port control registers. Upon receiving a load, store, or DSU instruction, which uses the RFILDS bits as an operand address, the RFI mode is enabled and each register operand address is substituted with the pre-setup port (operand) addresses by the RFI port logic as shown in the representative RFI logic of FIGS. 8, 9, and 11. RFI and non-RFI operations can be mixed when using the hardware of FIGS. 8 and 9. In fact, by using two contexts for the load, store, and DSU control registers, groups 0 and 1, as shown in FIG. 9, then, RFI XV operations on a first block of data, RFI operations using RFILSD on a second block of data, and non-RFI operations can be mixed. It can be appreciated that by proper extension of an arithmetic port register operand address range, an arithmetic instruction could, by referencing the RFILSD address, cause RFI to be invoked for the arithmetic instruction execution.

RFI Instruction Execution

RFI operation is enabled through control information contained in instruction words. This control information is used to specify whether conventional register address selection fields (operand address fields contained in the instruction) are to be used or whether the RFI selection of registers is to be used. In the presently preferred embodiment, the control information in the instruction, indirect VLIW XV instruction bits 21 and 20 202 of FIG. 2, indirectly specifies a control register or set of registers which are to be used to control RFI operation. One or more of these control register groups are available for RFI control as seen in FIG. 5. The XV RFI instruction both enables RFI mode and selects a control register group for controlling the RFI operation. The group of RFI control registers 510–580 shown in FIG. 5 allow all of the register ports to be RFI controlled, meaning that every execution unit may operate in RFI mode concurrently.

It is noted that the ManArray processor finishes the execution phase of its pipeline with a write back to the register file. This approach allows the next cycle after the write-back cycle to use the results in the next operation. By judicious programming, chaining of vector operations is then inherent in the architecture. No separate bypass paths need be provided in the execution units to support chaining.

A discussion concerning an exemplary use of RFI in accordance with the present invention is now presented to illustrate several advantageous aspects of the invention. Assuming an increment value of 1, RFBS value (M) a power of 2, starting register R2, the register addresses alternate between two registers, an even register R2 and its corresponding odd register (address+1) R3. For RFBS=4, the register addresses cycle among 4 values with an increment of 1. The following table shows some address sequences.

| Start Register | Increment | Register File Block Size | Sequence |
|---|---|---|---|
| R2 | 1 | 2 | R2, R3, R2, R3, . . . |
| R2 | 1 | 4 | R2, R3, R0, R1, R2, . . . |
| R5 | 1 | 4 | R5, R6, R7, R4, R5, . . . |
| R5 | 2 | 4 | R5, R7, R5, R7, . . . |
| R5 | 2 | 8 | R5, R7, R1, R3, R5, . . . |
| R6 | 2 | 8 | R6, R0, R2, R4, R6, . . . |
| R0 | 1 | 1 | R0, R1, R2, R3, . . . R31, R0, R1 . . . for non-Load/Store units<br>R0, R1, R2, R3, . . . R63 (cycles ALL registers) for Load/Store units |

Assume it is desired to calculate a simple matrix-vector multiplication on a 4-PE SIMD VLIW ManArray processor such as processor 100 of FIG. 1A. Further assume that the following instruction types are available.

| Pseudo Instructions | Operation |
|---|---|
| LDB $R_N$, $P_J$+ | Load Broadcast: Loads from a memory location specified by the address register $P_J$ in SP memory and stores the value into register $R_N$ of each PE (all receive the same value. $P_J$ is post-incremented by 1. |
| MAC $R_T$, $R_X$, $R_Y$ | Multiply-Accumulate: All PEs execute in SIMD fashion the operation $R_T = R_T + (R_X * R_Y)$ |
| ST $R_S$, $P_J$+ | Store: All PEs store source register $R_S$ to local PE memory location specified by $P_J$ $P_J$ is post-incremented by 1. |
| REP N, M | Execute the following N instruction M times |

Also, assume that a 4×4 matrix A is distributed to the 4 PEs, PE0, PE1, PE2 and PE3, such that each PE contains a row of the matrix in registers R4, R5, R6 and R7 (PE0 gets row 0, PE1 gets row 1, etc.) as shown in the following table.

| Register → | R4 | R5 | R6 | R7 |
|---|---|---|---|---|
| PE0 | a00 | a01 | a02 | a03 |
| PE1 | a10 | a11 | a12 | a13 |
| PE2 | a20 | a21 | a22 | a23 |
| PE3 | a30 | a31 | a32 | a33 |

If a sequence of 4×1 vectors are read in from main (SP) memory 105, multiplied by the matrix and the results stored in local PE memory 123, 123', 123" and 123'", an appropriate sequential algorithm might appear as follows if it is assumed R2 is zero initially:

```
LDB R0, P0+      ;load first element of input vector, x0
MAC R2, R4, R0   ;accumulate product: a_i0 * x0 (I is row index and
                 PE ID)
LDB R0, P0+      ;load second element of input vector, x1
MAC R2, R5, R0   ; accumulate product: a_i1 * x1
LDB R0, P0+      ;load third element of input vector, x2
MAC R2, R6, R0   ; accumulate product: a_i2 * x2
LDB R0, P0+      ;load last element of input vector, x3
MAC R2, R7, R0   ; accumulate product: a_i3 * x3
ST R2, P1+       ;store results: each local memory gets an element
                 of ;output vector
```

Performing this algorithm with VLIW instructions yields:

| VLIW | SIW | SIW | Execute Action |
|---|---|---|---|
| | LDB R0, P0+ | | ;Load |
| 1 | LDB R0, P0+ | MAC R2, R4, R0 | ;Load PEs and MAC x0 * a[i][0] |
| 2 | LDB R0, P0+ | MAC R2, R5, R0 | ;Load PEs and MAC x1 * a[i][1] |
| 3 | LDB R0, P0+ | MAC R2, R6, R0 | ;Load PEs and MAC x2 * a[i][2] |
| 4 | LDB R0, P0+ | MAC R2, R7, R0 | ;Load PEs and MAC x3 * a[i][3] |
| | ST R2, P1+ | | ;All PEs store Store result |

This requires 4 VLIW-type instructions, plus a single load LDB and a single store ST instruction, even though the only difference between these VLIW instructions is the second register specification of the MAC instruction.

Now if the example is performed using RFI, the process is as follows: Assume R2 and R0 are both initialized to zero and register file indexing is used with the following parameters associated with the VLIW indirectly executed by an XV instruction:

| Execution Unit Register Port | Increment | RFBS |
|---|---|---|
| Load Write Port | 0 | 1 |
| MAU Rx Readport | 1 | 4 |

Now the code can be written in compact VLIW form where the second register RFI sequence starts with R7→R4→R5→R6→R7, etc.

```
VLIW  LD RFIC, P1, ctrl                ;Initialize RFI control for
                                       MAU reg port
      REP 1, 5                         ;Repeat 1 instruction 5
                                       times
  1   LDB R0, P0+     MAC R2, R7, R0   ;Load and MAC: first
                                       ;MAC is 0 and last
                                       ;load reads into next
                                       ;vector (or garbage)
      ST              R2, P1+          ;Store results
```

The net effect is to reduce 9 instructions to 4 instructions. The fact that fewer VLIWs are used, reduces the number of iVLIWs executed and also the number of VLIWs that must be loaded in the ManArray architecture. These savings are indirect, but not insignificant since the VLIW memory (VIM) represents an expensive on chip resource. The RFI operation reduces the amount of VLIW memory needed, thus allowing for less-expensive chips.

While the present invention has been disclosed in the context of various aspects of presently preferred embodiments, it will be recognized that the invention may be suitably applied to other environments and applications consistent with the claims which follow.

We claim:

1. A data processor with register file indexing comprising:

an instruction sequencer and N execution units capable of executing up to N instructions in parallel;

a plurality of register files with registers which contain data operands read and written by the N execution units, each register file having read ports to and write ports from the N execution units; and read and write ports associated with each execution unit which have associated control circuitry and register file index (RFI) *control* registers which *control the selection of a first addressing approach and a second indirect addressing approach and* allow registers to be addressed using both [a] *the* first addressing approach in which fields of an instruction word made available to a particular execution unit directly specify addresses, and [a] *the* second indirect addressing approach in which the contents of [register file index] *look ahead* registers are utilized in specifying the addresses.

2. The apparatus of claim 1 wherein said processor is a VLIW processor.

3. The apparatus of claim 1 wherein said processor is an iVLIW processor.

4. The apparatus of claim 1 wherein said processor is one of a plurality of similarly configured processors in a ManArray architecture.

5. The apparatus of claim 1 further comprising a control mechanism whereby an instruction may optionally use one or more [RFI] *look ahead* registers to supply the address for its register file operands.

6. The apparatus of claim 1 further comprising a control mechanism whereby the [RFI] *look ahead* register may be optionally updated automatically after each use by adding or subtracting a constant from its current register address thereby selecting a different register for its next use.

7. The apparatus of claim 6 wherein said update by the control mechanism further causes the selected register to cycle through one of many possible programmable sets of registers, starting with a particular register within a set.

8. The apparatus of claim 1 further comprising a control mechanism operable such that each port's register index may be independently configured for an update method and a register address set, or optionally disabled for register file indexing.

9. The apparatus of claim 1 further comprising a crowd mechanism operable such that the [RFI] *look ahead* register associated with each register file port may be initialized automatically from a register field specified in an instruction.

10. A method of register file index (RFI) control comprising the steps of:

establishing an RFI control specification *in RFI control registers* to specify RFI control *and address* information for *at least one* register [ports] *port* used by a particular execution unit or units;

establishing RFI initialization control[:]*;* performing RFI update control *for updating a register port address in one of the RFI control registers associated with the at least one register port*;

executing an RFI instruction *as part of a first indirect approach to select an instruction for execution*; and specifying *the* register port [addresses] *address* utilizing *the updated register port address as part of* a [double] *second* indirect approach to [their] *select the* specification *of the register port address*.

11. The method of claim 10 wherein said step of *establishing* RFI control specification is performed utilizing *the* RFI control registers specifying all the RFI control information for register ports accessed by a particular execution unit.

12. The method of claim 11 wherein the RFI control information specifies RFI register update policy.

13. The method of claim 10 wherein said step of *establishing* RFI initialization *control* comprises the steps of:

writing control information into an RFI control register[:]*;* and setting a bit in an RFI reset register (RFIRR) corresponding to a particular RFI control group and particular execution unit.

14. The method of claim 10 wherein the step of updating a *look ahead* register *port* address comprises the step of:

updating a[n RFI] *look ahead* register for the next cycle by adding or subtracting a constant from [its] *the register port* address *stored in the look ahead register* while maintaining [its] *the register* port address within a particular set of register addresses.

15. The method of claim 14 wherein said updating is performed by specifying an increment value and a register file divisor (RFD) for each port to be controlled.

16. The method of claim 10 wherein the step of RFI instruction execution is enabled through control information contained in instruction words.

17. The method of claim 16 wherein said control information specifies whether standard register selection operand fields are used or whether RFI selection of registers is to be used.

18. The method of claim 16 wherein the control information indirectly specifies another control register or set of registers which are used to directly control RFI operation.

*19. A method for data processing with register file indexing (RFI), the method including:*

*receiving a plurality of instruction words for execution;*

*reading, based on a start of an RFI sequence indication stored in an RFI control register, a field in each of the plurality of instruction words to directly specify a first plurality of operand addresses of a plurality of registers, the plurality of registers as addressed by the first plurality of operand addresses containing a first plurality of data operands;*

*writing a second plurality of operand addresses to a look ahead register based on the first plurality of operand addresses as controlled by control circuitry and RFI control registers;*

*executing the plurality of instruction words in parallel utilizing the first plurality of data operands;*

*clearing the start of the RFI sequence indication;*

*specifying the second plurality of operand addresses of the plurality of registers by reading, based on the cleared start of the RFI sequence indication, the contents of the look ahead register, the plurality of registers as addressed by the second plurality of operand addresses containing a second plurality of data operands; and*

*executing the plurality of instruction words in parallel utilizing the second plurality of data operands.*

*20. The method of claim 19 wherein the control circuitry of the writing step further comprises:*

*adding or subtracting a constant to the first plurality of operand addresses.*

*21. The method of claim 19 further comprising:*

*initializing an RFI control register from a register field specified in one of the plurality of instruction words.*

*22. A control circuit apparatus for operating in both a register file index (RFI) mode and non-RFI mode, the control circuit apparatus comprising:*

*a register file storing a plurality of operands;*

*an instruction register holding a first instruction and a first operand address of the register file for execution with the first instruction;*

*RFI circuitry for calculating and holding a second operand address of the register file for execution with the first instruction; and*

*a multiplexer having two inputs and an output, one of the two inputs connecting to the instruction register and the other of the two inputs connecting to the RFI circuitry, the output connecting to the register file; and in response to a signal signaling RFI mode, the multiplexer selecting the first operand address during a first execution cycle and the second operand address during a second execution cycle; and upon loading the instruction register with a second instruction having a third operand address and in response to the RFI signal signaling non-RFI mode, the multiplexer selecting the third operand address; and the selected operand address specifying the operand from the register file for use by an execution unit when executing the first instruction or the second instruction in a third execution cycle.*

*23. The control circuit apparatus of claim 22 wherein the multiplexer selects the second operand address for execution cycles subsequent to the third execution cycle.*

*24. The control circuit apparatus of claim 22 wherein the RFI signal dependent on a bit in the instruction register.*

*25. The control circuit apparatus of claim 22 disposed in a VLIW processor.*

*26. The control circuit apparatus of claim 22 disposed in a iVLIW processor.*

*27. The control circuit apparatus of claim 22 wherein the second operand address represents the end of a block of operand addresses.*

*28. The control circuit apparatus of claim 22 wherein the RFI circuitry comprises an adder circuit for calculating the second operand address and a look ahead register storing the second operand address.*

*29. The control circuit apparatus of claim 28 wherein the RFI circuitry further comprises update control logic controlling the adder circuit for calculating the second operand address.*

*30. The control circuit apparatus of claim 28 wherein the second instruction is not loaded until a block of operand addresses have been calculated and executed.*

*31. The control circuit apparatus of claim 22 wherein the RFI mode or non-RFI mode are indications based upon information contained in the instruction register which are valid for the execution of each instruction loaded into the instruction register.*

*32. The control circuit apparatus of claim 22 wherein the second operand address is initialized prior to RFI operation by pre-setup loading of an initial second operand address.*

*33. The control circuit apparatus of claim 22 wherein the second operand address is calculated according to an increment value stored in the RFI circuitry.*

*34. The control circuit apparatus of claim 33 wherein the RFI circuitry comprises:*

*a modulo adder circuit for calculating the second operand address based on a current operand address, the increment value, and a block size; and*

*a look ahead register storing the second operand address and supplying the second operand address to the multiplexer.*

*35. The control circuit apparatus of claim 22 wherein the second operand address $R_{next}$ is calculated upon each receipt of the signal signaling RFI mode according to $R_{next}=((R_{current}+k)\bmod M)+Q*M$, wherein $R_{current}$ is the current value of the second operand address prior to calculating, k is an increment value, M is a block size, and Q is a floor quotient $\lfloor Rs/M \rfloor$ for a starting register operand address Rs and wherein Rcurrent is equal to Rs for the first calculation of an RFI sequence.*

*36. A method of operating in both a register file index (RFI) mode and non-RFI mode, the method comprising:*

*receiving a first instruction having a first operand address;*

*receiving a signal indicating RFI mode;*

*calculating a second operand address based on the first operand address;*

*selecting the first operand address;*

*retrieving an operand using the first operand address;*

*executing the first instruction with the retrieved operand;*

*selecting the second operand address;*

*retrieving an operand using the second operand address;*

*executing the first instruction with the retrieved operand;*

*receiving a second instruction;*

*receiving a signal indicating non-RFI mode;*

*selecting a third operand address carried in the second instruction;*

*retrieving an operand using the third operand address; and*

*executing the second instruction with the retrieved operand.*

*37. The method of claim 36 wherein the second operand address represents the end of a block of operand addresses to be executed with the first instruction.*

*38. The method of claim 36 wherein the received signal indicating RFI mode is based on a bit in the first instruction.*

*39. The method of claim 36 wherein the received signal indicating RFI mode is based on a miscellaneous register file.*

*40. The method of claim 36 wherein the received signal indicating RFI mode is based on the opcode carried in the receiving instruction.*

*41. The method of claim 36 further comprising, before the step of selecting the second operand address, the step comprising:*

*receiving a third instruction;*

*receiving a signal indicating non-RFI mode;*

*selecting a fourth operand address carried in the third instruction;*

*retrieving an operand address using the fourth operand address; and*

*executing a third instruction, the third instruction operating in a non-RFI mode.*

*42. The method of claim 36 wherein the calculating step comprises adding or subtracting from the first operand address.*

*43. The method of claim 36 wherein the calculating step comprises updating the second operand address upon each receipt of the signal indicating RFI mode.*

*44. The method of claim 43 further comprising:*

*initializing the second operand address prior to RFI operation with a pre-setup initial second operand address.*

*45. The method of claim 43 further comprising:*

*updating the second operand address according to an increment value.*

*46. The method of claim 45 further comprising:*

*calculating in a modulo adder circuit the second operand address based on a current value of the second operand address, the increment value, and a block size.*

*47. The method of claim 43 further comprising:*

*calculating the second operand address $R_{next}$ upon each receipt of the signal indicating RFI mode according to $R_{next}=((R_{current}+k) \bmod M)+Q*M$, wherein $R_{current}$ is the current value of the second operand address prior to calculating, k is an increment value, M is a block size, and Q is a floor quotient $\lfloor Rs/M \rfloor$ for a starting register Rs and wherein $R_{current}$ is equal to Rs for the first calculation of an RFI sequence.*

* * * * *